United States Patent [19]
Koschinski et al.

[11] Patent Number: 5,855,944
[45] Date of Patent: Jan. 5, 1999

[54] STABILIZATION OF MARINE OILS

[75] Inventors: Ingo Koschinski, Waldshut-Tiengen, Germany; Neil MacFarlane, North Humberside, England

[73] Assignee: Roche Vitamins Inc., Parsippany, N.J.

[21] Appl. No.: 811,998

[22] Filed: Mar. 5, 1997

Related U.S. Application Data

[63] Continuation of Ser. No. 689,757, Aug. 12, 1996, abandoned, which is a continuation of Ser. No. 256,064, filed as PCT/EP92/02543 Nov. 6, 1992, abandoned.

[30] Foreign Application Priority Data

Nov. 15, 1991 [GB] United Kingdom ............... 9124267
May 8, 1992 [GB] United Kingdom ............... 9210012

[51] Int. Cl.$^6$ ........................................ A23D 7/00
[52] U.S. Cl. .................. 426/541; 426/654; 426/330.6
[58] Field of Search ................. 426/330.6, 423, 426/422, 654, 541, 476, 486

[56] References Cited

U.S. PATENT DOCUMENTS

| | | |
|---|---|---|
| 4,101,673 | 7/1978 | Chang . |
| 4,375,483 | 3/1983 | Shuford ............... 426/330.6 |
| 4,588,745 | 5/1986 | Bessler ............... 514/552 |
| 4,804,555 | 2/1989 | Marschner ............... 426/476 |
| 4,874,629 | 10/1989 | Chang et al. . |
| 4,996,072 | 2/1991 | Marschner ............... 426/476 |
| 5,023,100 | 6/1991 | Chang et al. . |
| 5,077,069 | 12/1991 | Chang ............... 426/541 |
| 5,089,139 | 2/1992 | Asbeck ............... 426/330.6 |
| 5,230,916 | 7/1993 | Chang ............... 426/541 |
| 5,264,597 | 11/1993 | Van Dalen et al. . |
| 5,346,709 | 9/1994 | Myhre ............... 426/654 |
| 5,348,755 | 9/1994 | Roy ............... 426/423 |
| 5,364,886 | 11/1994 | Löliger et al. . |
| 5,427,814 | 6/1995 | Löliger et al. . |

FOREIGN PATENT DOCUMENTS

| | | |
|---|---|---|
| 0326829 | 1/1989 | European Pat. Off. . |
| 0340635 | 4/1989 | European Pat. Off. . |
| Sho 51-47005 | 4/1976 | Japan . |
| Sho 55-69688 | 5/1980 | Japan . |
| Sho 64-67152 | 3/1989 | Japan . |
| Hei 2-16195 | 1/1990 | Japan . |
| Hei 2-4899 | 1/1990 | Japan . |
| 0 304 115B1 | 6/1994 | Japan . |
| WO92/11768 | 7/1992 | WIPO ............... 426/330.6 |

OTHER PUBLICATIONS

Han et al., Stabilization of Vitamin C in Fish Oil and Synergistic Effect with Vitamin E in Retarding Oxidation, JAOCS. vol. 68, No. 10, pp. 740–743 (Oct. 1991).

Han et al., Antioxidative Effect of Ascorbic Acid Solubilized in Oils via Reversed Micelles, Journal of Food Science, vol. 55, No. 1 pp. 247–2149 (1990).

Welsh et al., Phosphorus and Trace Metal Removal with a Novel Refining Material von, Paper presented to the American Oil Chemists' Society Annual Meeting, Honolulu, Hawaii, May 15, 1986.

Kosmetika, Riechstoffe und Lebensmittelzusatzstoffe, Georg Thieme Verlag, Stuttgart 1978, Seite 96.

Firmenschrift "Trisyl® Silica Gele" der Firma Grace.

*Primary Examiner*—Carolyn Paden
*Attorney, Agent, or Firm*—George W. Johnston; Dennis P. Tramaloni; Bruce A. Pokras

[57] ABSTRACT

A process for stabilizing fully or partially refined marine oil is disclosed. Here marine oil is treated with silica having a surface area greater than 500 m$^2$ per gram. Then the silica treated oil is soft vacuum steam deodorized at a temperature between 140° C. and about 210° C. Finally the oil is treated with a combination of lecithin, ascorbyl palmitate and tocopherol in ratios of 6-3:4-2:8-4 the range of 1000 parts per million to 4000 parts per million.

29 Claims, No Drawings

STABILIZATION OF MARINE OILS

This is a continuation of application Ser. No. 08/689,757, filed Aug. 12, 1996, abandoned which is a continuation of Ser. No. 08/256,064, filed Sep. 8, 1994, abandoned, which is a national stage of International Application No. PCT/EP92/02543 filed Nov. 6, 1992.

BACKGROUND OF THE INVENTION

The present invention relates to the stabilization of marine oils. More particularly of fully or partially refined marine oils.

Marine oils have attracted substantial interest as a source of long-chain polyunsaturated fatty acids, particularly eicosapentaenoic acid (EPA), docosapentsenoic acid (DPA) and docosahexaenoic acid (DHA), which are considered to be of dietary significance. These fatty acids contain 5 or 6 double bonds, which render them prone to atmospheric oxidation. It is believed that the peroxides produced in this oxidation break down to secondary oxidation products, which exhibit a pronounced taste and smell of fish.

It has been known for a long time that refined marine oil is initially free from a taste and smell of fish, but that reversion through oxidation occurs rapidly. Attempts have been made to stabilize the oil by the addition of α-tocopherol or mixed tocopherols at a level of 0.1%, but this has resulted only in a short term improvement in stability, i.e. a few days. Stabilization with tetrabutylhydroquinone has also been proposed, but this is of very restricted application having regard to the extremely bitter taste of this compound.

There has accordingly been a need for a process by means of which such marine oil can be stabilized over a long period in a simple and economical manner.

SUMMARY OF THE INVENTION

It has now surprisingly been found in accordance with the present invention that fully or partially refined marine oil can be stabilized over a longer period than hitherto, particularly over several months, by treating the oil with silica and incorporating a lecithin, ascorbyl palmitate and a tocopherol in the thus-treated oil.

DESCRIPTION OF THE PREFERRED EMBODIMENTS

The present invention is based the foregoing finding and is accordingly concerned with an improved process for the stabilization of fully or partially refined marine oil, by means of lecithin, ascorbyl palmitate and a tocopherol and involving a silica treatment, comprising treating said oil with silica having a surface area greater than 500 $m^2$ per gram, subjecting said silica treated oil to a soft vacuum steam deodorization at a temperature between about 140° C. and about 210° C., and incorporating a lecithin, ascorbyl palmitate and a tocopherol in the ratio of 6-3:4-2:8-4 in the thus-treated oil, whereby the stabilization brought about lasts for several months.

The partially purified marine oil used in the present invention is one which has been neutralized and bleached in a conventional manner and the fully refined marine oil, also used in the present invention, is one which has been subjected to the additional step of deodorization, likewise in a conventional manner. It is preferred to use a fully refined marine oil in the present invention. The oil can be, for example, herring oil, anchovy oil, sardine oil, menhaden oil, pilchard oil, shark oil, hake oil etc. or a blend of one or more of these oils.

The silica used in the present invention can be any conventional silica such as, for example, those available as Trisyl and Trisyl 300 (Grace), Britesorb (Akzo) or SD959, SD1027 and Sorbsil C60 (Crosfield). It is preferred to use a silica which is dried or substantially freed from water before or during the process, i.e. which preferably has a water content of up to about 2%, preferably up to about 1%. The drying of the silica can be achieved, for example, by heating at about 100° C. for about 3 hours. Alternatively, the silica can be dried in heated oil under a vacuum or by azeotropic distillation.

The treatment of the oil with silica can suitably be carried out in one embodiment by contacting tie oil with the silica in a silica-filled column or stirred reactor vessel or a combination thereof. Batch, semi-batch or continuous operation is feasible. Silica having a surface area of more than 500 $m^2$ per gram is used. It is preferred to carry out this treatment at about room temperature, although lower or, especially, higher temperatures may also be used if desired. Further, it is preferred to perform this embodiment under the atmosphere of an inert gas, especially nitrogen. The contact time between the oil and the silica can be varied within wide limits and can be a few seconds to several days. In this connection, the flow rate at which the oil passes through the silica in a column procedure will depend on factors such as the type and particle size of the chosen silica, the dimensions of the column and the like.

In another embodiment, an oil/solvent miscella is passed through a silica column. The solvent is preferably a food grade approved apolar solvent, preferably a hydrocarbon and especially hexane. This embodiment can be carried out e.g. by dissolving the oil in the solvent to provide a solution containing about 20–60%, preferably 33%, oil by weight, passing the solution through silica in a column or stirred reactor vessel or a combination thereof using a ratio of miscella to silica of 20:1 to 5:1, preferably 15:1, (wt./wt.), filtering and then removing the solvent by distillation. Here again, the contact time between the oil and the silica can be varied within wide limits and can be a few seconds to several days.

The treatment with silica described hereinbefore can also be carried out in the presence of carbon. The carbon which is used is preferably dried or substantially freed from water before or during the process and, furthermore, preferably has a surface area of more than 1100 $m^2$ per gram. Examples of suitable carbons are those available as Norit, e.g. Norit CA1, and similar activated carbons.

In the next stage of the process, a lecithin, ascorbyl palmitate and a tocopherol are incorporated in the silica-treated oil.

Any food-grade or cosmetic-grade lecithin can be used in the present invention. It is, however, preferred to use a solid and/or liquid food-grate lecithin which is commercially available. An example of such a lecithin is Epikuron 100G (Lucas Meyer, D-2000 Hamburg, Germany).

Likewise, any tocopherol can be used in the present invention, with examples of such tocopherols being α-tocopherol, γ-tocopherol or a mixture of natural tocopherols. In a preferred embodiment γ-tocopherol is used.

The lecithin, ascorbyl palmitate and tocopherol are used in a ratio of 6-3:4-2:8-4, especially 3:2:4, and the combined amount thereof incorporated into the silica-treated oil is preferably 1000–4000 parts per million, especially 2000–3500, preferably ca. 2250 or 3000 parts per million. The lecithin, ascorbyl palmitate and tocopherol can be incorporated as a mixture or individually. When a mixture is used, the incorporation is preferably carried out at about 20°–90° C. especially about 60° C. When the components are incorporated individually, the lecithin is preferably incorporated at above about 40° C., especially at about 60° C., the ascorbyl palmitate is preferably incorporated at above about 90° C., especially at about 130° C., and the tocopherol is preferably incorporated at above about 20°–60° C., especially at about 60° C.

The resulting oil which is even superior in taste and smell is obtained by the additional so-called soft vacuum steam deodorization, namely at a temperature between about 140° C. and about 210° C. and is carried out before the lecithin, ascorbyl palmitate and tocopherol are incorporated in the silica-treated oil. This additional step can be carried out using conventional equipment and in a batch, semi-batch or continuous operation. Preferably, this step is carried out at between about 150° C. and about 170° C., or even about 190° C. for about 2 to about 5 hours, especially about 1 to about 4 hours, under a pressure of about 2 to about 10 mbar, especially about 3 to about 5 mbar.

The term "soft" should indicate that this deodorisation step is carried out at temperatures which are (somewhat) lower than the usual deodorization temperatures, and/or at reaction times which are (somewhat) shorter than the usual reaction times used in this process.

The use of the aforementioned steam deodorization permits a reduction in adsorbent levels from 50-20% by weight (adsorbent/oil) to as low as 5%, which is more attractive economically. The latter figure would in fact be ¼ of the amount used (i.e. 20%) without this additional step.

The stabilized marine oils manufactured in accordance with the invention are useful for incorporation into foodstuffs such as margarines, spreads, mayonnaise and the like and into cosmetic and dietary products, e.g. supplements. Methods for e.g. refining marine oils are known.

U.S. Pat. No. 5,006,281 describes such process. The material process is considerably more involved (claim 1, claim 11), and uses very particularly activated columns, and furthermore, antioxidant mixtures being different from the present mixtures, in as far as, inter alia, γ-tocopherol and ascorbyl palmitate are used.

The process of EP 326 829 deals with a particular antioxidant mixture, a mixture which is different from the material composition of the present case, in as far as tocopherol, ascorbic acid and lecithine are used. Furthermore, no refining step is disclosed here.

EP 340 635, though disclosing also an adsorption step for the deodorization of marine oils, using, inter alia, also silica gel, recommends totally different antioxidants, namely preferably Rosemary extract and furthermore, a different sequence of steps, namely preferably first the deodorization step, then the silicid acid treatment to achieve the refining of the oils is recommended.

This fact applies also to GB 1522 149, dealing with the purificartion of nutritive glyceride oils, to EP 304 115 dealing with marine/vegetable oil blends, and makes use of, inter alia, a refining step using a silicate, to WO 91/10367 dealing with margarine spreads, which can contain ascorbyl palmitate, α-tocopherol and propylgallate as the antioxident mixture, to U.S. Pat. No. 2,464,927 dealing with antioxidant mixtures for oils and fats, and this according to

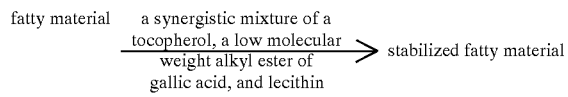

and finally to GB 558 922 dealing with the refining of fat—soluble vitamin containing oils or concentrates using natural vegetable antioxidant concentrates.

The following Examples illustrate the present invention, but do not limit the scope thereof in any manner. In the Examples the lecithin used was Epikuron 100G.

EXAMPLE 1

(a) 100 g of conventionally degummed, neutralized and bleached marine oil containing 18% EPA and 12% DHA were mixed with 50 g of wet Trisyl (60% water content) and heated to 80° C. while stirring vigorously under a vacuum, which rapidly reached 70 mbar and gradually increased to 25 mbar over a period of 1 hour when bubbles ceased to evolve from the mixture. The heating was stopped, the vacuum was broken, the mixture was cooled to 40° C. and 200 g of hexane were added. The mixture was filtered over a funnel (9 cm diameter; Whatman No. 1 paper during 5 minutes, the filter residue comprising a silica bed was washed with 40 g of hexane and the combined filtrate and washings were evaporated, initially under a low vacuum and then under a high vacuum (1 mbar for 1 hour). There were obtained 94.5 g of a pale yellow odour-free oil having a mild fish taste.

(b) A mixture of lecithin, ascorbyl palmitate and γ-tocopherol in an amount of 750:500:1000 ppm was dissolved in the oil obtained according to (a) by heating at 90° C. for 1 hour on a rotary evaporator (25 mbar vacuum) to give the desired stabilized oil.

(c) The oil obtained according to (b) was evaluated for stability on a Rancimat® apparatus (Metrohm Ltd., CH-9101 Herisau, Switzerland) at 100° C. The oil showed an induction time (i.e. the time taken for the oil to reach the onset of rancidity) of 10.1 hours compared with an induction time of 1.5 hours for the oil obtained according to (a).

EXAMPLE 2

The procedure described in Example 1 was repeated except that a mixture of lecithin, ascorbyl palmitate and α-tocopherol was used in (b) in an amount of 750:500:1000 ppm. The induction time of the thus-stabilized oil determined on a Rancimat® apparatus at 100° C. was 7.1 hours.

EXAMPLE 3

The procedure described in Example 1 was repeated except that in (a) the hexane treatment was omitted and the mixture was filtered directly to give 83 g of a pale yellow odour-free oil having a mild fish taste and in (b) a mixture of lecithin, ascorbyl palmitate and α-tocopherol was used in an amount of 750:500:1000 ppm.

Evaluation of the resulting stabilized oil on a Rancimat® apparatus gave an induction time of 8 hours at 100° C.

EXAMPLE 4

(a) 100 g of conventionally degummed, neutralized and bleached marine oil containing 18% EPA and 12% DHA were dissolved in 200 g of hexane and 20 g of dry chromatographic grade silica were added. The mixture was stirred for 5 minutes and then filtered over a No. 2 porosity sintered filter at a flow rate of 1 ml/cm²/minute. After washing the silica present on the filter with 40 g of hexane and the combined miscella and washings were evaporated to give 91.4 g of a taste-free and odour-free pale yellow oil.

(b) A mixture of lecithin, ascorbyl palmitate and γ-tocopherol in an amount of 750:500:1000 ppm was dissolved in the oil obtained according to (a) by heating at 90° C. for 1 hour on a rotary evaporator (25 mbar vacuum) to give the desired stabilized oil.

(c) The stability of the oil obtained according to (b) was evaluated on a Rancimat® apparatus at 90° C. The oil showed an induction time of 27.7 hours compared with an induction time of 1.5 hours for the oil obtained according to (a).

EXAMPLE 5

150 g of deodorized marine oil were mixed with 30 g of silica (GRACE Trisyl SP 2-7887) and the mixture was heated to 80° C. for 2 hours at about 30 mbar on a rotary evaporator. The suspension was then cooled to room temperature and 300 g of hexane were added. The mixture was stirred for 1.5 hours and filtered. The hexane was removed from the mixture on a rotary evaporator to yield 146.6 g of a clear yellow oil with a slightly fishy taste and smell.

140 ml of this oil were "soft" deodorized at 155° C. under 5 mbar for 2.5 hours and then cooled to room temperature. The deodorized oil was free from the taste and smell of fish. 750 ppm of lecithin, 1000 ppm of α-tocopherol and 500 ppm of ascorbyl palmitate were added at 60° C.

The Rancimat induction time (100° C., 20 1 air/hour) recorded for this oil was 9.25 hours compared with 6.4 hours for the silica-treated oil without the soft deodorization step, but stabilized in the same manner.

EXAMPLE 6

200 g of deodorized marine oil were mixed with 40 g of silica (GRACE Trisyl SP 2-7915) and the mixture was heated to 80° C. for 2 hours at about 30 mbar on a rotary evaporator. The suspension was then cooled to room temperature and 400 g of hexane were added. The mixture was stirred for 1.5 hours and filtered. The hexane was removed from the mixture on a rotary evaporator to yield 165.2 g of a clear yellow oil with a slightly fishy taste and smell.

127 ml of this oil were "soft" deodorized at 155° C. under 5 mbar for 2.5 hours and then cooled to room temperature. The deodorized oil was free from the taste and smell of fish. 750 ppm of lecithin, 1000 ppm of α-tocopherol and 500 ppm of ascorbyl palmitate were added at 60° C.

The Rancimat induction time (100° C., 20 1 air/hour) recorded for this oil was 4.9 hours compared with 3.4 hours for the silica treated oil stabilized in the same manner.

EXAMPLE 7

200 g of deodorized marine oil were mixed with 40 g of silica (GRACE Trisyl SP 2-7915) and the mixture was heated to 80° C. for 2 hours at about 30 mbar on a rotary evaporator. The suspension was then cooled to room temperature within 1.5 hours and filtered to yield 165. g of a clear yellow oil with a slightly fishy taste and smell.

125 ml of this oil were "soft" deodorized at 155° C. under 5 mbar for 2.5 hours and then cooled to room temperature. The deodorized oil was free from the taste and smell of fish. 750 ppm of lecithin, 1000 ppm of α-tocopherol and 500 ppm of ascorbyl palmitate were added at 60° C.

The Rancimat induction time (100° C., 20 1 air/hour) recorded for this oil was 5.2 hours compared with 4.5 hours for the silica treated oil without the soft deodorization step, but stabilized in the same manner.

EXAMPLE 8

1.582 g of deodorized marine oil were mixed with 79 g of silica (GRACE Trisyl SP 2-8998) and the mixture was heated to 80° C. for 2 hours at about 30 mbar on a rotary evaporator. 31 6 g of activated carbon (Norit CA1) were added and the mixture was heated for a further hour under a vacuum of 30 mbar. After cooling, the mixture was filtered to yield a clear yellow oil with an unpleasant taste and smell; neither of which could be described as fishy.

500 ml of this oil were "soft" deodorized at 190° C. for 2 hours at 4 mbar and then cooled to room temperature. The deodorized oil was free from the taste and smell of fish. 750 ppm of lecithin, 1000 ppm of α-tocopherol and 500 ppm of ascorbyl palmitate were added at 60° C.

The Rancimat induction time (90° C.; 20 1 air/hour) recorded for this oil was 11 hours, compared with 7 hours for the oil prior to the final deodorization and 0.5 hour for the oil used as the starting material.

We claim:

1. A stabilized Marine oil which has been silica treated and subjected to a soft vacuum steam deodorization at a temperature between about 140° C. and about 210° C., and said silica treated oil having incorporated therein a lecithin, ascorbyl palmitate and a tocopherol in the respective ratios of 6-3:4-2:8-4 with respect to said silica treated oil wherein the combined amount of said lecithin, ascorbyl palmitate, and tocopherol is in the range of from 1000 parts per million to 4000 parts per million in said treated oil.

2. The product of claim 1 wherein the combined amount of said lecithin, ascorbyl palmitate and tocopherol in the in range of from 2000 parts per million to 3500 parts per million.

3. A process for the stabilization of fully or partially refined marine oil, which process comprises treating said oil with silica having a surface area greater than 500 m² per gram, subjecting said silica treated oil to a soft vacuum steam deodorization at a temperature between about 140° C. and about 210° C., and incorporating lecithin, ascorbyl palmitate and a tocopherol in the ratio of 6-3:4-2:8-4 in said treated oil wherein the combined amount of said lecithin, ascorbyl palmitate and tocopherol is in the range from 1000 parts per million to 4000 parts per million in said treated oil.

4. The process of claim 3 wherein the combined amount of said lecithin, ascorbyl palmitate and tocopherol is in the range from 2000 parts per million to 3500 parts per million.

5. The process of claim 4 wherein the marine oil is fully refined marine oil.

6. The process of claim 5 wherein said silica is dry or substantially free of water.

7. The process of claim 6 wherein said oil is treated by contacting said oil with said silica in a column or stirred reactor vessel or a combination thereof.

8. The process of claim 7 wherein said oil is treated by passing an oil/solvent miscella through said silica in a column or stirred reactor vessel or a combination thereof, filtering and subsequently removing the solvent.

9. The process of claim 8, wherein the solvent is a food grade approved apolar solvent.

10. The process of claim 9, wherein said solvent is a hydrocarbon.

11. The process of claim 10, wherein said hydrocarbon is hexane.

12. The process of claim 11 wherein said column or stirred reaction vessel further contains activated carbon.

13. The process of claim 12 wherein said activated carbon is dry or substantially free of water.

14. The process of claim 13 wherein said activated carbon has a surface area of greater than 1100 m² per gram.

15. The process of claim 14 wherein a mixture of said lecithin, ascorbyl acetate and tocopherol are incorporated into said treated oil.

16. The process of claim 15 wherein said mixture is incorporated into said treated oil at about 20°–90° C.

17. The process of claim 16 wherein said mixture is incorporated into said treated oil at about 60° C.

18. The process of claim 15 wherein said deodorization is carried out at a temperature of about 150° C. to about 170° C.

19. The process of claim 18 wherein said deodorization is carried out for about 2 to 5 hours.

20. The process of claim 18 wherein said deodorization is carried out for about 1 to 4 hours.

21. The process of claim 20 wherein the deodorization is carried out at a pressure of about 2 to about 10 mbar.

22. The process of claim 21 wherein the deodorization is carried out at a pressure of about 3 to about 5 mbar.

23. The process of claim 14 wherein said lecithin, ascorbyl acetate and tocopherol are separately incorporated into said treated oil.

24. The process of claim 23 wherein said lecithin is incorporated into said treated oil at above about 40° C.

25. The process of claim 24 wherein said lecithin is incorporated into said treated oil at about 60° C.

26. The process of claim 23 wherein said ascorbyl palmitate is incorporated into said treated oil at above about 90° C.

27. The process of claim 26 wherein said ascorbyl palmitate is incorporated into said treated oil at about 130° C.

28. The process of claim 23 wherein said tocopherol is incorporated into said treated oil at about 20°–60° C.

29. The process of claim 28 wherein said tocopherol is incorporated into said treated oil at about 60° C.

\* \* \* \* \*

UNITED STATES PATENT AND TRADEMARK OFFICE
CERTIFICATE OF CORRECTION

PATENT NO. : 5,855,944
DATED : January 5, 1999
INVENTOR(S) : KOSCHINSKI ET AL.

It is certified that error appears in the above-identified patent and that said Letters Patent is hereby corrected as shown below:

In Column 6, line 33, (claim 2, line 2) delete "in the in" and insert therefor -- is in the --.

Signed and Sealed this

Seventh Day of September, 1999

Attest:

Q. TODD DICKINSON

*Attesting Officer*         *Acting Commissioner of Patents and Trademarks*